United States Patent [19]
Takikawa et al.

[11] Patent Number: 4,976,103
[45] Date of Patent: Dec. 11, 1990

[54] METAL-MADE CARRIER BODY FOR CARRYING THEREON EXHAUST GAS CLEANING CATALYST

[75] Inventors: Kazunori Takikawa; Haruo Serizawa, both of Shizuoka, Japan

[73] Assignee: Usui Kokusai Sangyo Kabushiki Kaisha, Japan

[21] Appl. No.: 366,990

[22] Filed: Jun. 16, 1989

[51] Int. Cl.$^5$ .............................................. F01N 3/28
[52] U.S. Cl. ..................................... 60/299; 422/180
[58] Field of Search .................. 60/299; 422/179, 180

[56] References Cited

U.S. PATENT DOCUMENTS

| | | | |
|---|---|---|---|
| 4,282,186 | 8/1981 | Nonnenmann | 422/180 |
| 4,348,360 | 9/1982 | Chang | 422/180 |
| 4,863,700 | 9/1989 | Ten Eyck | 422/180 |
| 4,925,634 | 5/1990 | Yokokoji | 422/180 |

*Primary Examiner*—Douglas Hart
*Attorney, Agent, or Firm*—Lowe, Price, Leblanc, Becker & Shur

[57] ABSTRACT

A metal-made carrier body is provided for carrying thereon an exhaust gas cleaning catalyst. The carrier body is formed by superposing a sheet-like metal band made of a thin metal sheet and a corrugated band made from another thin metal sheet one over the other in a contiguous relation into a multi-layered composite body defining many network-patterned gas flow passages along a central axis thereof and then enclosing the multi-layered composite body within a cylindrical metal casing. The cylindrical metal casing has a double-layer structure composed of an inner portion made of a metal material having a coefficient of thermal expansion similar to that of the constituent members of the multi-layered composite body and an outer portion made of another metal material having greater heat- and corrosion-resistance than the metal material of the inner portion.

5 Claims, 2 Drawing Sheets

METAL-MADE CARRIER BODY FOR CARRYING THEREON EXHAUST GAS CLEANING CATALYST

BACKGROUND OF THE INVENTION

1. Field of the Invention:

This invention relates to a metal-made carrier body adapted to carry thereon an exhaust gas cleaning catalyst which is generally provided as an exhaust gas cleaning means at an intermediate point of an exhaust pipe of an automobile.

More specifically, this invention makes use of a double-layer structure as a metal material of a cylindrical metal casing of the metal-made carrier body, thereby avoiding breakage and cracking of sheet-like band and corrugated band, said bands making up the metal-made carrier body, separation between a multi-layered composite body of these bands and the metal casing, corrosion of an outer surface of the metal casing, etc. and hence providing a metal-made carrier body capable of fully performing its function even under severe use conditions.

2. Description of the Related Art:

Conventional metal-made carrier bodies of the above sort, which are adapted to carry an exhaust gas cleaning catalyst thereon, include those having a structure formed by laminating at least one sheet-like metal band and at least one corrugated metal band in layers or rolling them together into a multi-layered composite body with a view toward increasing the carrying area per unit volume, namely, with a view toward increasing as much as possible the effective area of contact between exhaust gas and the exhaust gas cleaning catalyst per unit volume and further reducing the own weight of the metal-made carrier body to a maximum possible extent.

For example, a sheet-like metal band made of a heat-resistant thin metal sheet having a thickness of 0.1 mm or smaller and a corrugated band made from another thin metal sheet of the same type are superposed one over the other to have areas of contact therebetween. They are then rolled together spirally into a multi-layered composite body defining many network-patterned gas flow passages along a central axis thereof for allowing exhaust gas to pass therethrough. The multi-layered composite body thus rolled is enclosed within a cylindrical metal casing which has a single-layer structure and opens in both ends thereof. The members of the multi-layered composite body, i.e., the sheet-like band and corrugated band are put together into a vibration-proof structure. Namely, the sheet-like band and corrugated band as well as the multi-layered composite body thus rolled and the metal casing are put together at the areas of contact therebetween by welding, brazing or the like.

As the heat-resistant thin metal sheets for making the multi-layered composite body, metal sheets of ferritic stainless steel having a small coefficient of thermal expansion such as chromium steel (Cr content: 11-13.5%) or chromium-aluminum steel (Cr content: 20%, Al content: 5%) can be used. On the other hand, as the material for the metal casing, a single-layer austenitic stainless steel sheet is used to meet the requirements for high-temperature mechanical strength and corrosion resistance to the external atmosphere although it has a large coefficient of thermal expansion.

The joining of the sheet-like band and corrugated band, which make up the multi-layered composite body, and that of the multi-layered composite body and the metal casing require brazing with a high-temperature brazing material such as heat-resistant Ni because of the high temperature of the exhaust system of an automobile. Upon brazing, the metal casing made of the austenitic stainless steel having the large coefficient of thermal expansion thus undergoes substantial thermal expansion while the multi-layered composite body made of the ferritic stainless steel having the small coefficient of thermal expansion does not expand significantly. Accordingly, a thermal stress occurs at each area of contact so that the associated members may be separated there. In addition, when a metal-made carrier body formed by enclosing the multi-layered composite body within the metal casing is actually installed in the exhaust system of an automobile, the members making up the metal-made carrier body are subjected to repeated thermal stresses under the cooling and heating cycle of from $-20°$ C. to $900°$ C. because strains (thermal strains) occur around the areas of contact between the multi-layered composite body and metal casing because of the large difference between their coefficients of thermal expansion. In addition, stresses caused by external vibrations such as those transmitted from an associated engine are also applied, so that the areas of contact between the multi-layered composite body and metal casing are subjected to substantial fatigue stresses. As a result, the members making up the metal-made carrier body, namely, the multi-layered composite body and metal casing show greater tendency of separation around the areas of contact therebetween, and at the same time the members forming the multi-layered composite body, i.e., the sheet-like band and corrugated band also become more susceptible to cracking and breakage. The conventional metal-made carrier bodies however cannot prevent such fatigue failure.

OBJECT AND SUMMARY OF THE INVENTION

An object of this invention is to provide a metal-made carrier body for carrying an exhaust gas cleaning catalyst thereon, which can prevent separation of its constituent members from each other and cracking of the constituent members themselves and also has corrosion resistance sufficient for use at elevated temperatures.

In one aspect of this invention, there is thus provided a metal-made carrier body for carrying thereon an exhaust gas cleaning catalyst, said carrier body having been formed by superposing a sheet-like metal band made of a thin metal sheet and a corrugated band made from another thin metal sheet one over the other in a contiguous relation into a multi-layered composite body defining many network-patterned gas flow passages along a central axis thereof, and then enclosing the multi-layered composite body within a cylindrical metal casing. The cylindrical metal casing has a double-layer structure composed of an inner portion made of a metal material having a coefficient of thermal expansion similar to that of the constituent members of the multi-layered composite body and an outer portion made of another metal material having greater heat-and corrosion-resistance than the metal material of the inner portion.

In the metal-made carrier body of this invention for carrying the exhaust gas cleaning catalyst thereon, the cylindrical metal casing—one of the constituent members thereof—is formed of two materials so that (i) the metal material having the coefficient of thermal expansion similar to that of the constituent members of the multi-layered composite body enclosed in the casing, namely, similar to the coefficient of thermal expansion of the sheet-like band and corrugated band is provided as an inner layer of the casing and (ii) the different metal material having excellent heat and corrosion resistance are provided as an outer layer of the casing. In other words, the cylindrical metal casing is formed into the double-layer structure. Therefore, the metal casing can effectively absorb and relax thermal strains which are generally developed when metal-made carrier bodies of this sort are used under severe temperature conditions. The metal-made carrier body according to this invention can hence effectively prevent separation between the multi-layered composite body and metal casing and breakage and cracking of the sheet-like band and/or corrugated band making up the multi-layered composite body. In addition, the metal casing maintained in contact with the external atmosphere can exhibit superb corrosion resistance even when employed under severe temperature conditions. Namely, the metal-made carrier body of this invention makes it possible to perform stable cleaning of exhaust gas over a long period of time.

DETAILED DESCRIPTION OF THE INVENTION AND PREFERRED EMBODIMENTS

Figure 1:
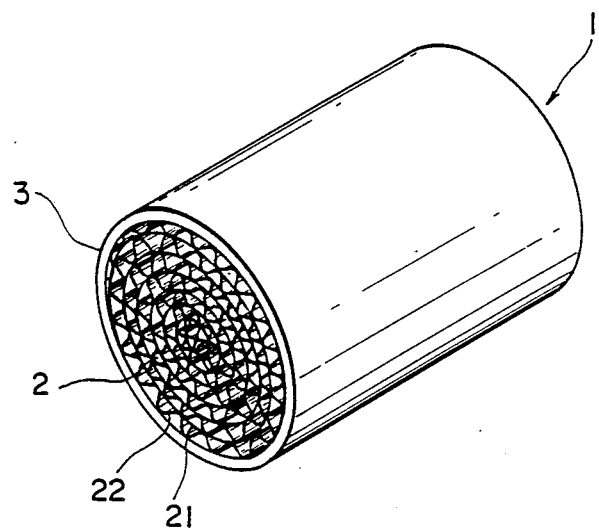
FIG. 1 is a perspective view of a rolled metal-made carrier body according to one embodiment of this invention, which is suitable for use in carrying an exhaust gas cleaning catalyst.

As described above, the greatest feature of the present invention resides in the use of the double-layer structure for the metal casing, in which the multi-layered composite body of the sheet-like band and corrugated band is enclosed, in order to improve the performance of the metal-made carrier body adapted to carry an exhaust gas cleaning catalyst thereon.

In the prior art, the constituent members, especially, the multi-layered composite body of the sheet-like band and corrugated band and the metal casing of the metal-made carrier body are prevented from separation by a joining means such as blazing with a view toward providing a vibration-proof structure as described above. However, a certain limitation is unavoidably imposed on the degree of vibration-proofness. Metal-made carrier bodies of this sort are used under severe temperature conditions. Because of thermal strains caused in such an environment, the constituent members, especially the sheet-like band and/or corrugated band are susceptible to breakage and cracking. Against this problem, no effective measure has however been incorporated in the prior art.

This invention thus features that the double-layer structure is adopted for the metal material forming the metal casing of the metal-made carrier body to avoid mutual separation of the multi-layered composite body and metal casing, which make up the metal-made carrier body, and also breakage, cracking and the like of the constituent members of the multi-layered composite body, i.e., the sheet-like band and corrugated band, said separation, breakage, cracking and the like being caused by thermal strains, while maintaining the heat and corrosion resistance of the metal casing.

In this invention, the double-layer structure of the metal material which makes up the cylindrical metal casing is formed in the following manner.

(i) In conventional metal casings, ferritic stainless steel or austenitic stainless steel is solely used.

(ii) Metal casings made of ferritic stainless steel are inexpensive, but are inferior in heat resistance (mechanical strength at high temperatures) and high-temperature oxidation resistance to austenitic metal casings. On the other hand, austenitic metal casings have excellent heat and corrosion resistance but are costly.

Regarding their thermal expansion characteristics, the former stainless steel, namely, ferritic stainless steel has a coefficient of thermal expansion very close to the coefficients of thermal expansion of heat-resistant steels employed for the sheet-like band and corrugated band, for example, chromium steel (JIS G 4305, SUS 4101U) (Cr content: 11–13.5%) and ferritic stainless steel (Cr content: 20%, Al content: 5%). On the other hand, austenitic stainless steel has a greater coefficient of thermal expansion compared with such heat-resistant steels.

(iii) From the foregoing, the double-layer structure of the metal material which makes up the metal casing of the present invention can be achieved by using:

(a) as an inner layer of the metal casing, a metal material having a similar coefficient of thermal expansion to the members forming the multi-layered composite body, namely, the sheet-like band and corrugated band which are both heat-resistant thin sheet metals, for example, ferritic stainless steel (specifically, SUS 430 or the like); and (b) as an outer layer of the metal casing, a metal material having excellent heat and oxidation resistance, for example, austenitic stainless steel (specifically, SUS 310S or the like).

As has already been described above, the metal casing employed in the metal-made carrier body according to this invention are preferably formed of a clad steel which includes ferritic stainless steel and austenitic stainless steel.

When the metal material of the cylindrical metal casing is formed into a double-layer structure by using two metal materials, the constituent members of the multi-layered composite body and the inner layer are similar in coefficient of thermal expansion so that thermal strains can be effectively absorbed or relaxed. Further, the outer layer of the metal casing can contribute to improvements in the mechanical strength and oxidation resistance at high temperatures. It is accordingly possible to obtain a metal-made carrier body for an exhaust gas cleaning catalyst, which is far superior to conventional metal-made carrier bodies.

Embodiments of the metal-made carrier body of this invention for carrying an exhaust gas cleaning catalyst will next be described in detail with reference to the accompanying drawings.

Figure 2:
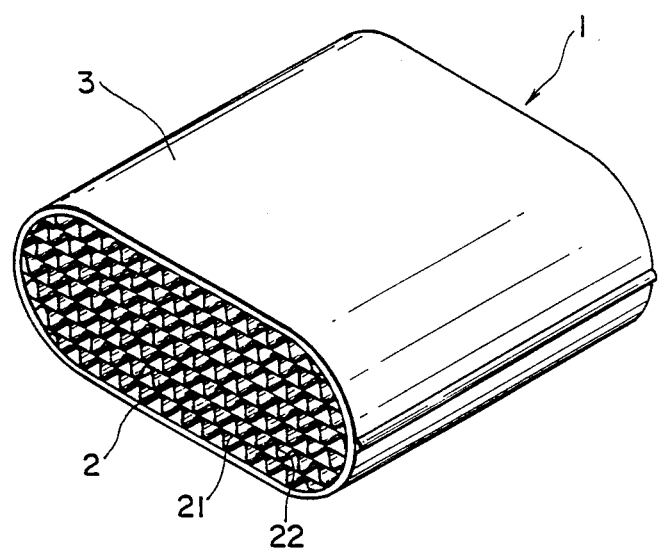
FIG. 2 is a perspective view of a laminated metal-made carrier body according to another embodiment of this invention, which is suitable for use in carrying an exhaust gas cleaning catalyst.

FIG. 1 is a perspective view of a metal-made carrier body according to one embodiment of this invention. The metal-made carrier body, which is generally designated at numeral 1, is constructed in the following manner. A sheet-like band 21 and a corrugated band 22, which are each formed of a heat-resistant thin sheet metal, are superposed one over the other. They are then rolled together into a multi-layered composite body 2. The multi-layered composite body 2 is thereafter enclosed in a cylindrical metal casing 3, and the constituent members are joined together by brazing or the like to provide the metal-made carrier body 1. FIG. 2 is a perspective view of a metal-made carrier body 1 according to another embodiment of this invention. Sheet-like bands 21 and corrugated bands 22, which are each formed of a heat-resistant thin sheet metal, are stacked alternately as layers, thereby forming a multi-layered composite body 2. The multi-layered composite body 2 is thereafter enclosed in a metal casing 3, and the constituent members are joined together to provide the metal-made carrier body 1.

Figure 3:
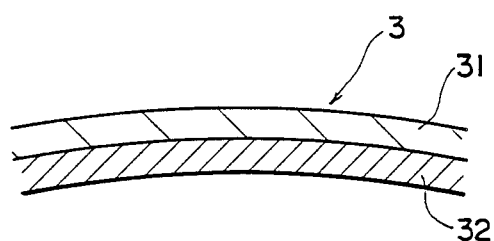
FIG. 3 is an enlarged fragmentary cross-section of a metal casing.

The principal feature of the present invention, namely, the double-layer structure of the two materials in the metal casing is illustrated in FIG. 3. Namely, the metal casing 3 has a clad structure formed of an outer metal material 31 and inner metal material 32.

This invention will hereinafter be described in detail by the following examples. It should however be borne in mind that various changes and modifications can be made to the examples without departing from the spirit of the present invention.

EXAMPLE 1

(i) Construction of multi-layered composite body:

A sheet-like band and a corrugated band were superposed one over the other to define areas of contact therebetween. The sheet-like band was a 0.04 mm thick heat-resistant thin sheet metal of ferritic stainless steel (Cr content: 20%, Al content: 5%), while the corrugated band had been obtained by feeding a sheet metal of the same type as the above sheet metal between forming gears and forming the first-mentioned sheet metal into a wavy shape with longitudinal ridges spaced at pitches of 2.5 mm. The sheet-like band and corrugated band were then rolled together into a spiral form and were spot-welded at desired locations to prevent them from loosening. As a result, a multi-layered composite body having an outer diameter of about 70 mm and defining many network-patterned gas flow passages along a central axis thereof was formed.

(ii) Construction of metal casing:

A steel pipe made of SUS 430, a ferritic stainless steel, and coated at an outer surface thereof with a Ni-base brazing material was used as an inner metal material, while a steel pipe made of SUS 310S, an austenitic stainless steel, was used as an outer metal material. They were closely put together by a co-drawing technique, thereby forming a composite-pipe metal casing having an inner diameter of about 70 mm, a thickness of 1.2 mm and a length of 75 mm.

The multi-layered composite body was force-fitted in the metal casing. They were coated with a brazing material and then subjected to a heat treatment to braze the bands to each other, the multi-layered composite body and metal casing at areas of contact therebetween, and the inner and outer layers of the metal casing, at the same time. Accordingly, a metal-made carrier body having sufficient resistance to thermal strains and corrosion resistance and adapted to carry an exhaust gas cleaning catalyst was successfully obtained.

EXAMPLE 2

(i) Construction of multi-layered composite body:

A sheet-like band and a corrugated band, which had each been obtained using a heat-resistant thin steel band of the same type as those employed in Example 1, were cut into desired dimensions. They were then alternately stacked in layers and welded at desired locations, thereby forming a multi-layered composite body having an oval cross-section of about 145 mm × 85 mm and a length of 115 mm and defining many network-patterned gas flow passages along a central axis thereof.

(ii) Construction of metal casing:

A clad steel pipe, whose inner and outer layers were made of SUS 430 - ferritic stainless steel - and SUS 309S - austenitic stainless steel - respectively, was cut into a length of 115 mm and then formed into an oval cross-section, whereby a composite-pipe metal casing was obtained. The oval cross-section had an inner major axis of 145 mm and an inner minor axis of 85 mm.

The multi-layered composite body was force-fitted in the metal casing of the oval cross-section. They were coated with a brazing material and then subjected to a heat treatment to simultaneously braze the bands to each other and the multi-layered composite body and metal casing at areas of contact therebetween. Accordingly, a metal-made carrier body similar to that obtained in Example 1 was successfully obtained.

What is claimed:

1. A metal-made carrier body for carrying thereon an exhaust gas cleaning catalyst, said carrier body having been formed by superposing a sheet-like metal band made of a thin metal sheet and a corrugated band made from another thin metal sheet one over the other in a contiguous relation into a multi-layered composite body defining many network-patterned gas flow passages along a central axis thereof, and then enclosing the multi-layered composite body within a cylindrical metal casing, characterized in that the cylindrical metal casing has a double-layer structure composed of an inner portion made of a metal material having a coefficient of thermal expansion similar to that of the constituent members of the multi-layered composite body and an outer portion made of another metal material having greater heat- and corrosion-resistance than the metal material of the inner portion.

2. The metal-made carrier body as claimed in claim 1, wherein the cylindrical metal casing is made of a clad steel having ferritic stainless steel as the metal material of the inner portion and austenitic stainless steel as the metal material of the outer portion.

3. The metal-made carrier body as claimed in claim 1, wherein the metal material of the inner portion of the cylindrical metal casing and the metal material of the outer portion thereof are brazed to each other.

4. The metal-made carrier body as claimed in claim 1, wherein the multi-layered composite body is in a spiral form.

5. The metal-made carrier body as claimed in claim 1, wherein the multi-layered composite body is in a laminate form.

* * * * *